B. D. STRAIGHT.
BUTTER SERVER.
APPLICATION FILED JULY 3, 1915.
1,268,510.
Patented June 4, 1918.
7 SHEETS—SHEET 1.
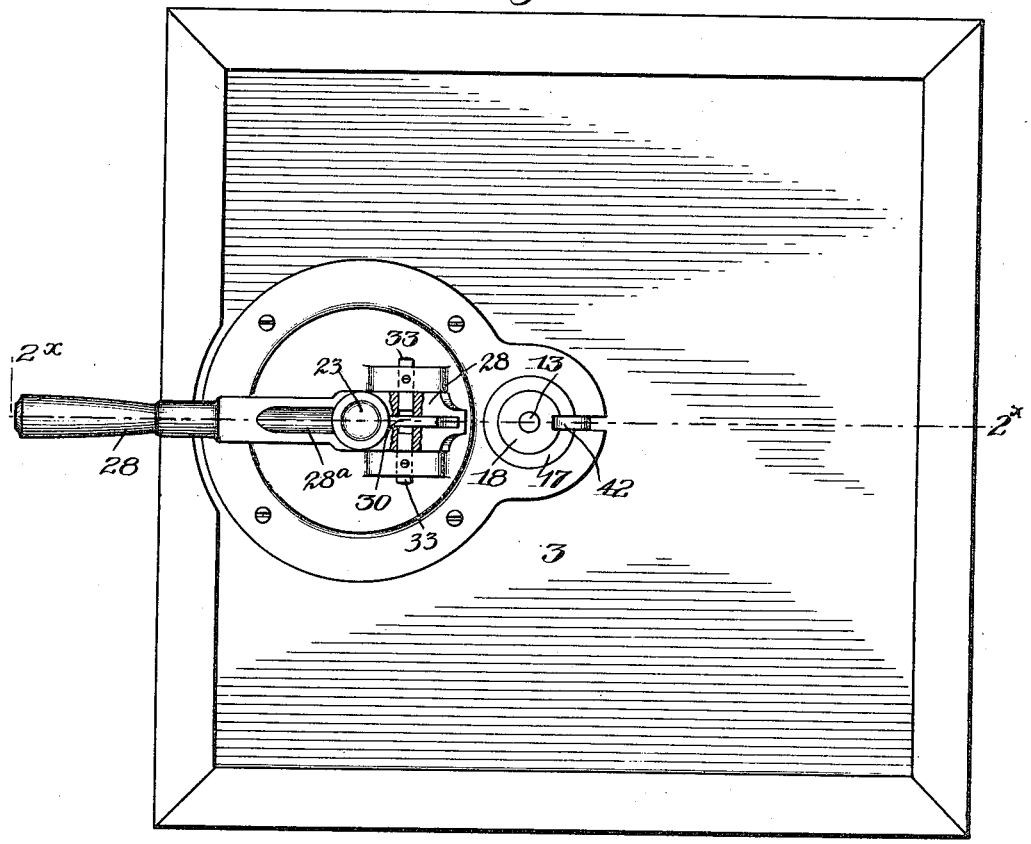
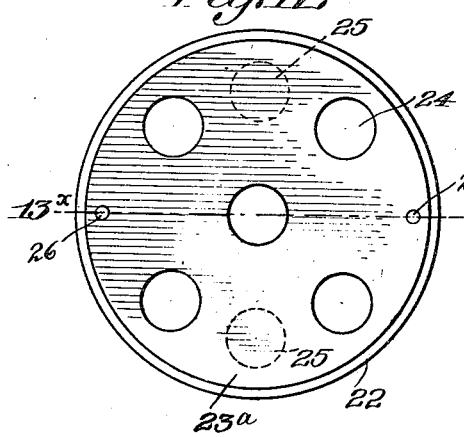
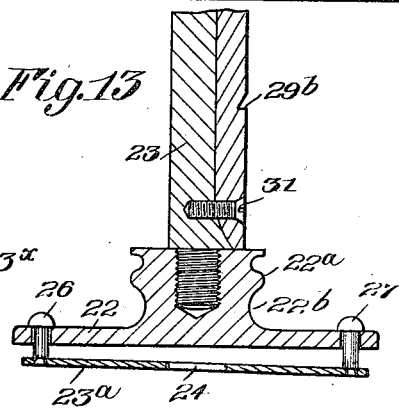
INVENTOR
Bennett D. Straight
BY
his ATTORNEYS B. D. STRAIGHT.
BUTTER SERVER.
APPLICATION FILED JULY 3, 1915.
1,268,510.
Patented June 4, 1918.
7 SHEETS—SHEET 2.
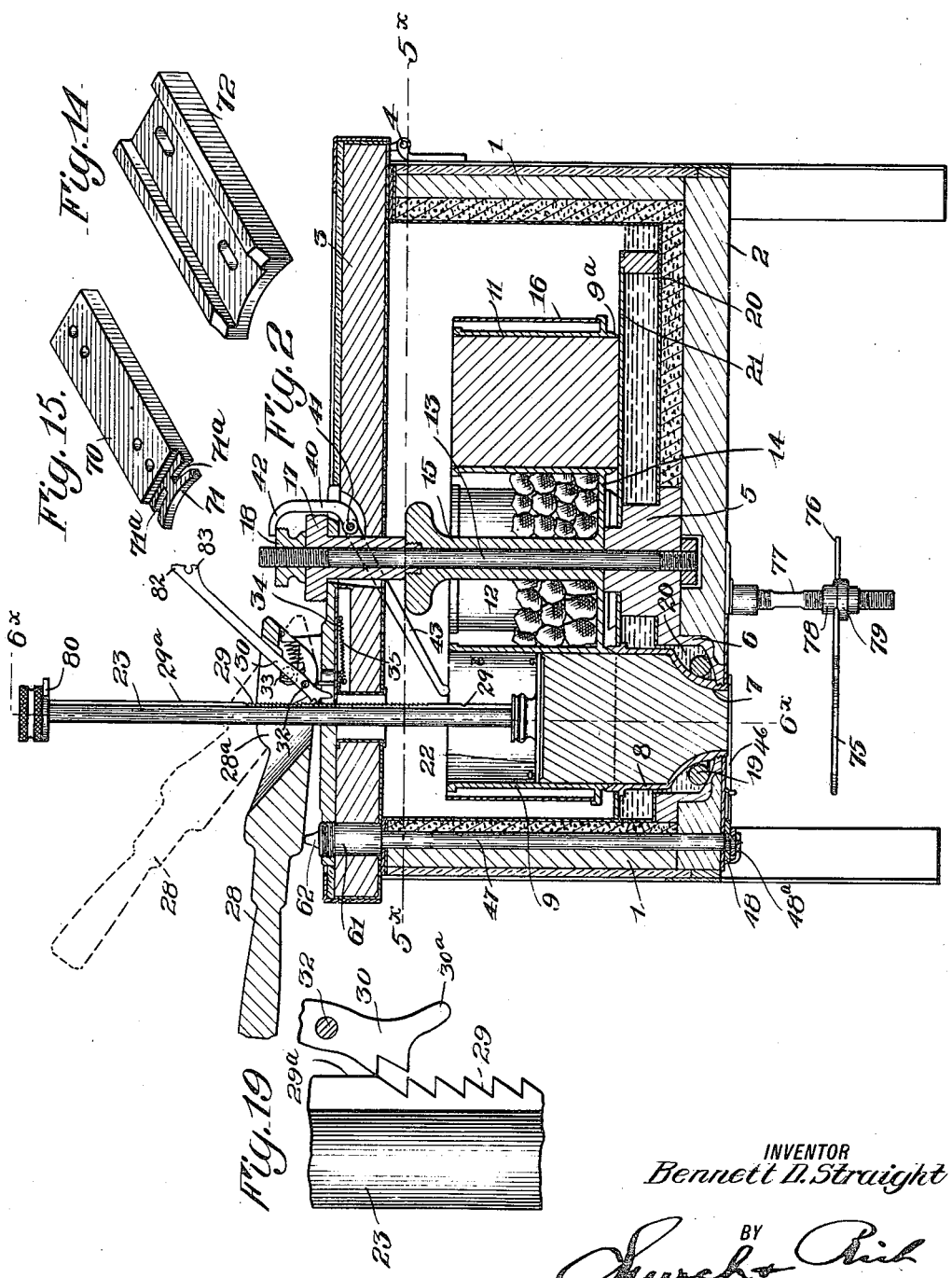
INVENTOR
Bennett D. Straight
BY
his ATTORNEYS

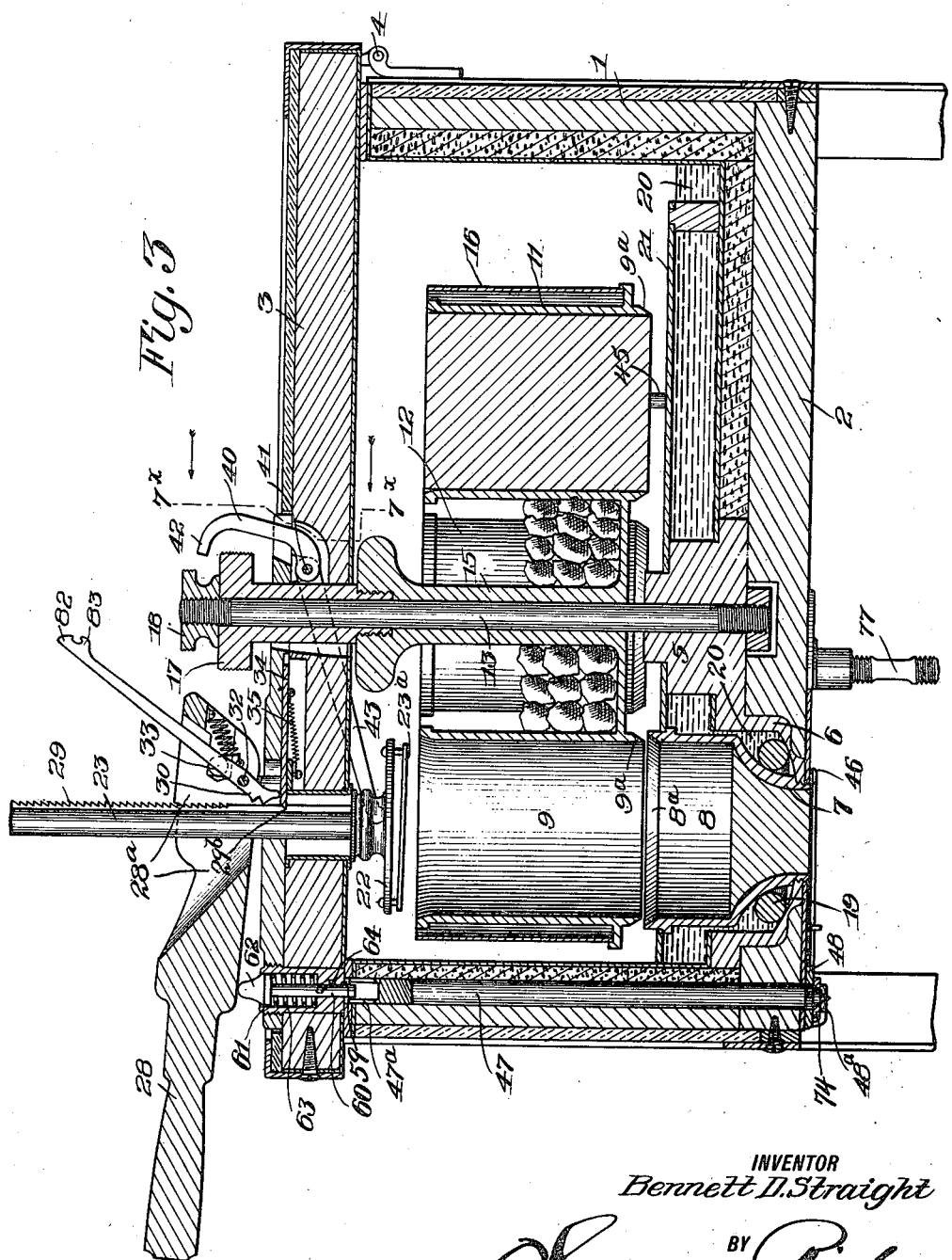

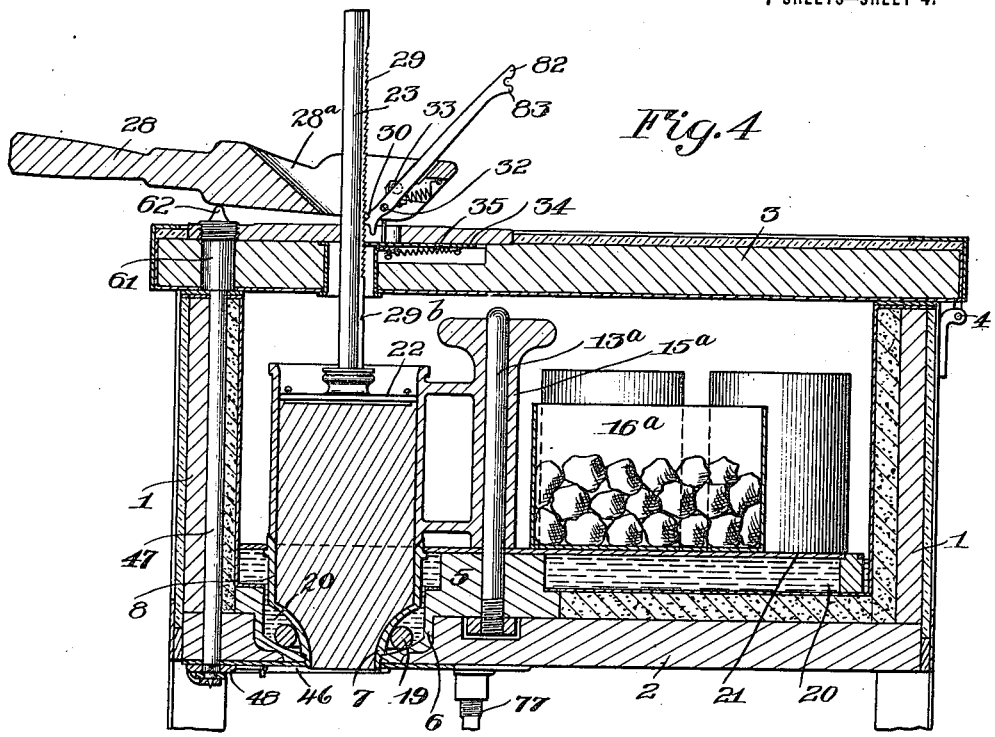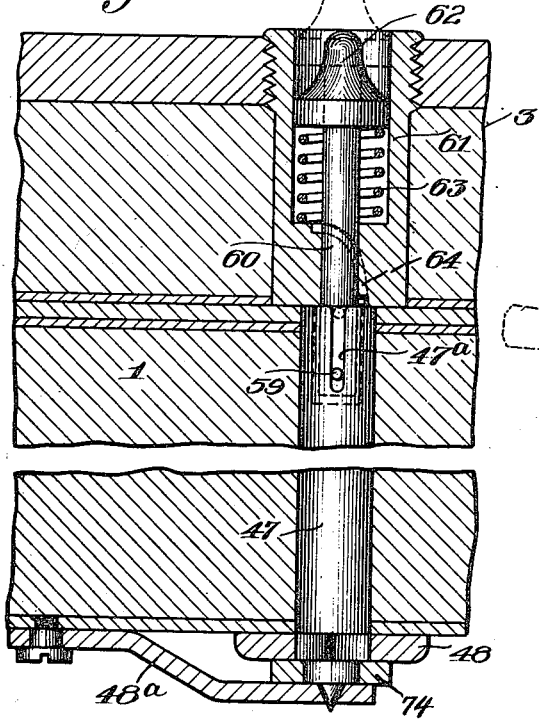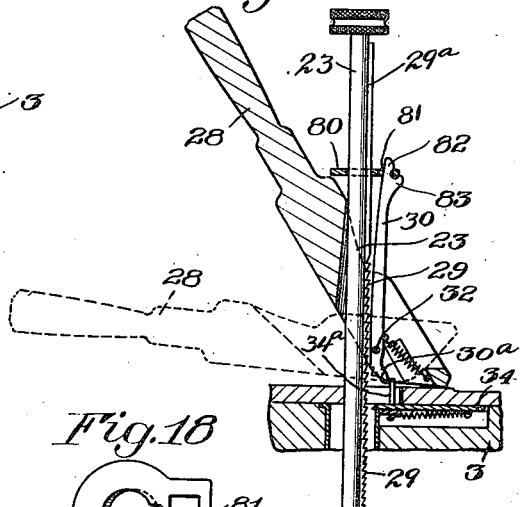

B. D. STRAIGHT.
BUTTER SERVER.
APPLICATION FILED JULY 3, 1915.
1,268,510.
Patented June 4, 1918.
7 SHEETS—SHEET 5.
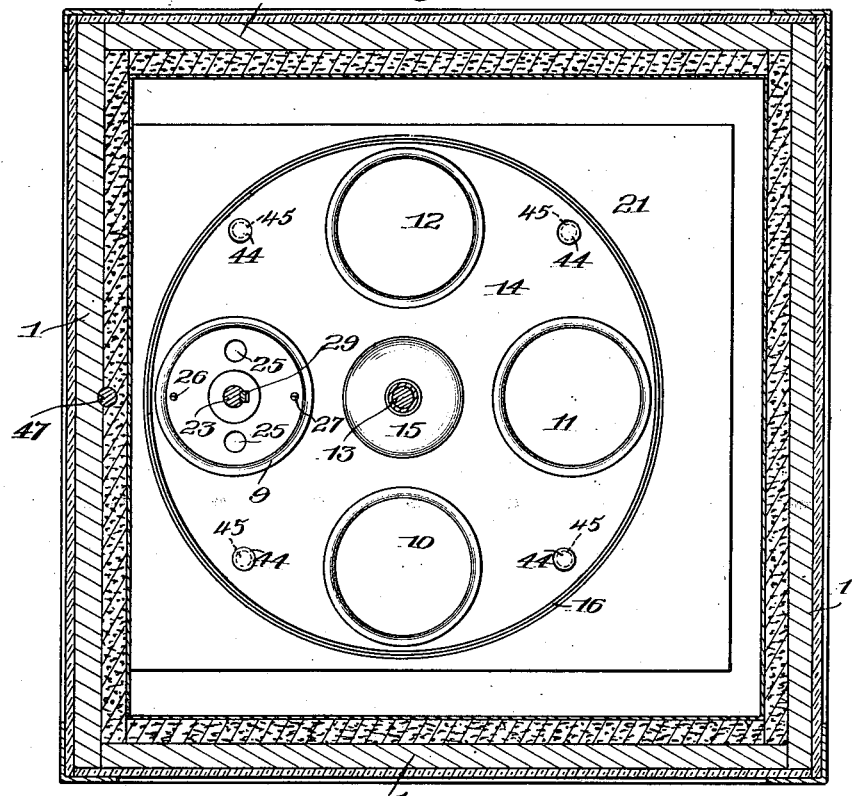
Fig. 5
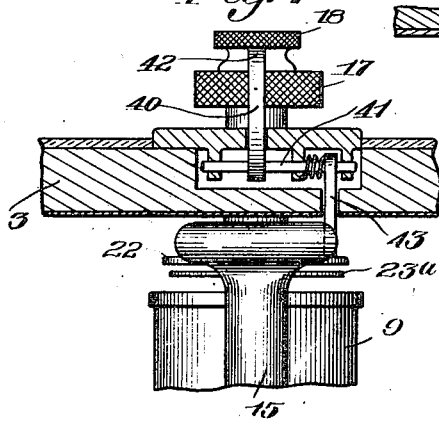
Fig. 7
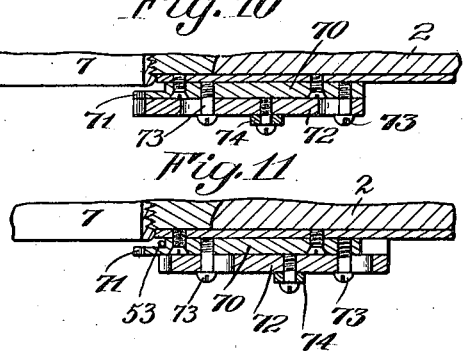
Fig. 10
Fig. 11
INVENTOR
Bennett D. Straight
BY
his ATTORNEYS

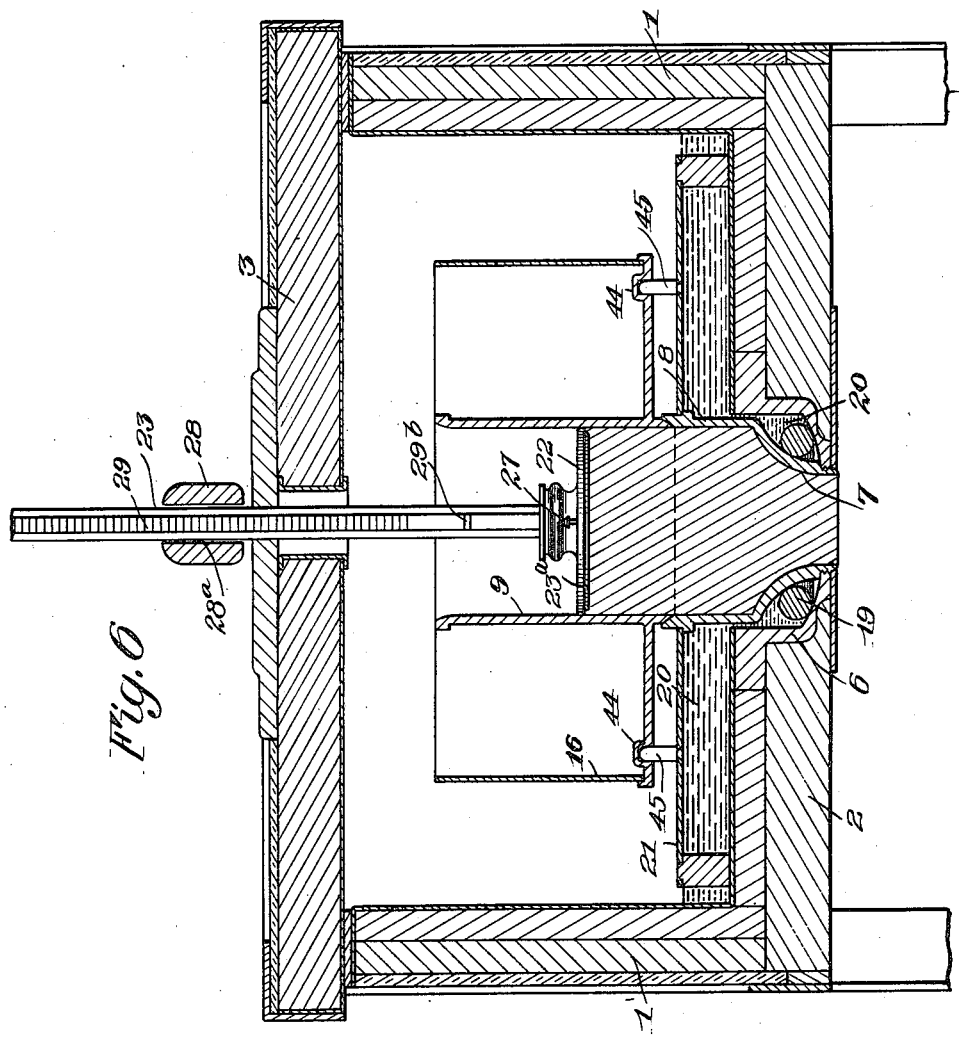

B. D. STRAIGHT.
BUTTER SERVER.
APPLICATION FILED JULY 3, 1915.
1,268,510.
Patented June 4, 1918.
7 SHEETS—SHEET 7.
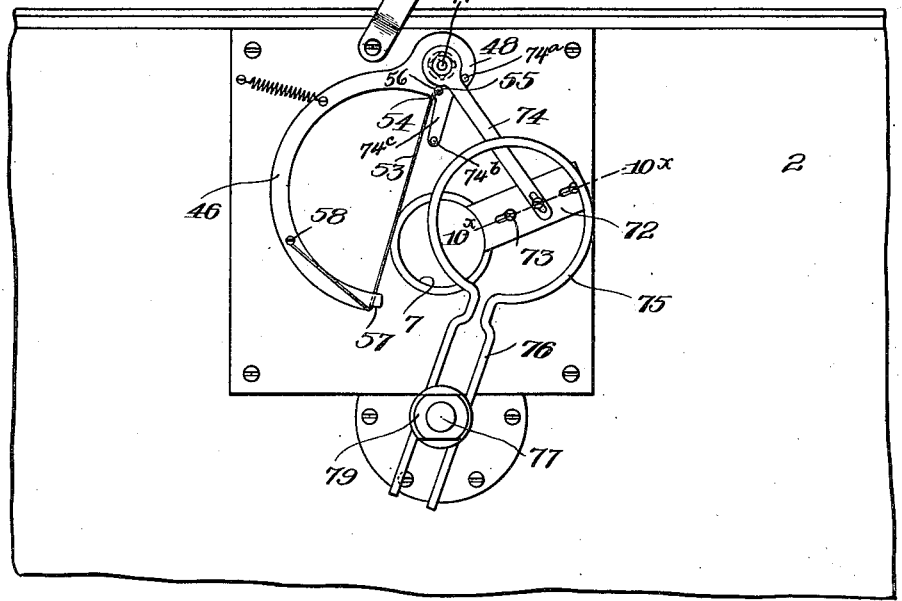
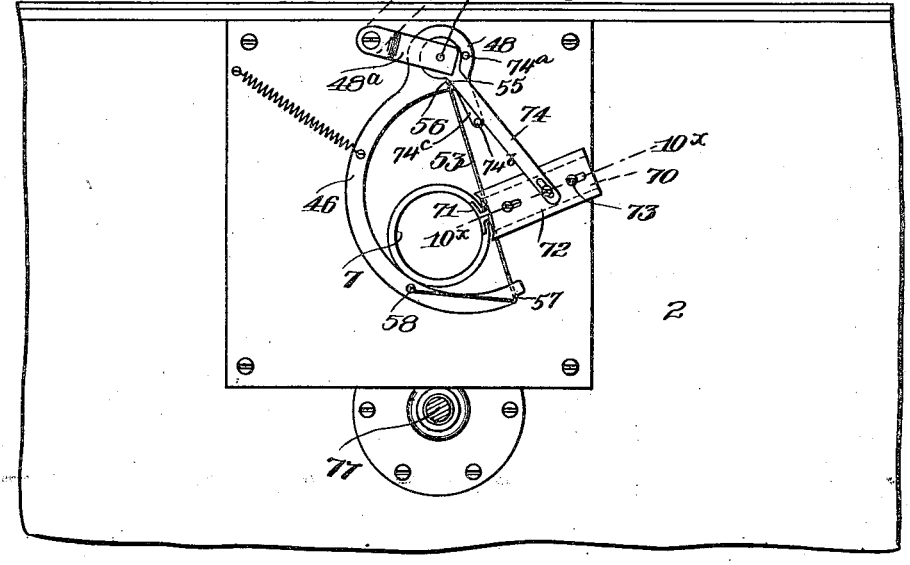
INVENTOR
Bennett D. Straight
BY
his ATTORNEYS

UNITED STATES PATENT OFFICE.

BENNETT D. STRAIGHT, OF ROCHESTER, NEW YORK, ASSIGNOR, BY MESNE ASSIGNMENTS, TO BUTTER SERVING MACHINE COMPANY, INC., OF ROCHESTER, NEW YORK, A CORPORATION OF NEW YORK.

BUTTER-SERVER.

1,268,510.  Specification of Letters Patent.  Patented June 4, 1918.

Application filed July 3, 1915. Serial No. 38,011.

*To all whom it may concern:*

Be it known that I, BENNETT D. STRAIGHT, of Rochester, in the county of Monroe and State of New York, have invented certain new and useful improvements in Butter-Servers; and I do hereby declare the following to be a full, clear, and exact description of the same, reference being had to the accompanying drawings, forming a part of this specification, and to the reference-numerals marked thereon.

My present invention has for its object to provide an apparatus intended primarily for serving butter in patties of equal size which is adapted for use in such places as hotels and restaurants. More specifically stated the invention contemplates a machine having a discharge mold or nozzle with which coöperates a removable butter container, a plurality of which are preferably employed and mounted on a movable carrier which is adjustable to successively position the containers in operative position, the whole being contained within a suitable casing or refrigerating chamber upon the exterior of which is arranged a mechanism for ejecting the butter and severing the portion which is expressed. To these and other ends the invention consists in certain improvements and combinations of parts all as will be hereinafter more fully described, the novel features being pointed out in the claims at the end of the specification.

In the drawings:

Figure 1 is a top plan view of a machine constructed in accordance with my invention with the ejector actuating pawl removed and the operating lever partly in section;

Fig. 2 is a cross sectional view taken on the line $2^x$—$2^x$ of Fig. 1, showing the parts in their normal position;

Fig. 3 is a similar view, the ejector being shown retracted and the movable carrier elevated into position for adjustment;

Fig. 4 is a sectional view similar to Figs. 2 and 3 showing a single container removably mounted in coöperative relation to the discharge nozzle.

Fig. 5 is a sectional view taken on the line $5^x$—$5^x$ of Fig. 2;

Fig. 6 is a vertical sectional view taken on the line $6^x$—$6^x$ of Fig. 2;

Fig. 7 is a detail sectional view illustrating the operation of the carriage lock, the parts being shown as viewed in the direction of the arrows on the section line $7^x$—$7^x$ of Fig. 3;

Figs. 8 and 9 are bottom plan views illustrating the operation of the cutting member;

Figs. 10 and 11 are detail sectional views taken on the line $10^x$—$10^x$ of Fig. 8 and $10^x$—$10^x$ of Fig. 9 respectively;

Fig. 12 is a bottom plan view of the ejector;

Fig. 13 is a cross sectional view taken on the line $13^x$—$13^x$ of Fig. 12;

Fig. 14 is a detail perspective view of the butter patty stop cleaning plate;

Fig. 15 is a similar view of the butter patty stop;

Fig. 16 is a detail view of the operating lever or prime mover illustrating action of the pawl in retracting the ejector;

Fig. 17 is an enlarged detail sectional view of the cutter operating devices;

Fig. 18 is a plan view of the ejector retracting member; and

Fig. 19 is a detail of the rack and pawl illustrating the multiple tooth engagement.

Similar reference numerals throughout the several views indicate the same parts.

A dispensing apparatus constructed in accordance with my present invention is intended to contain a supply of butter which is first preferably molded into the desired forms, such as cylinders, in which condition it is supplied to a plurality of containers where it is retained until desired, a container being then placed in operative position on the discharge nozzle. In the preferred form of the apparatus the containers are formed into a carrier which is adjustable to position one or another of them in operative relation with a discharge nozzle or mold. When the containers are in the operative position they are in alinement with an ejector which is preferably actuated by a reciprocatory lever, the operation of which controls the movement of the cutting member, operating beneath the nozzle, said parts being so timed in their movements that the cutting or severing of the butter occurs after the desired amount has been expressed. In addition to the features described the machine also comprises a locking device controlling the movement of the butter container-carrier which coöperates with the ejector and is not released until the latter is retracted, thus preventing any attempted adjustment of the parts until the ejector has been withdrawn into an inoperative position.

In illustrating one embodiment of my present invention I have shown a machine comprising an outer casing having side walls 1 and the rectangular bottom 2, said walls being insulated as shown. The casing is closed by the top or cover 3 which is hinged at one edge as indicated at 4 in Figs. 2, 3 and 4. Supported on the bottom 2 is a casting having the upwardly extending portion 5 forming a hub, and a recessed portion indicated by 6, provided with an aperture into which is screw threaded the restricted or tapered neck 7 of the butter mold or discharge nozzle. The latter may be of any desired shape interiorly to mold the butter passing therethrough and its inner face is preferably curved as shown to enlarge the nozzle inwardly to the full diameter of the discharge chamber of which it is a part thereby forming the cylindrical collar 8 having its upper horizontal edge chamfered as indicated at 8$^a$. The carrier provided with the plurality of butter containers is adjustably supported within the casing and may be formed by uniting a plurality of cylinders as indicated by 9, 10, 11 and 12 into a common member which, in the present instance, is shown as being adapted for rotary movement about the shaft or spindle 13 projecting vertically from the hub 5. In the present instance this carrier or member is shown as comprising a base 14 having a central bearing 15 and carrying a drum 16 which surrounds the several containers and forms a receptacle in which ice or similar cooling medium may be supplied. The lower end of each of the several containers on the carrier extends below the plate 14 and is beveled as indicated by 9$^a$ to fit the chamfer 8$^a$ of the underlying mold and to permit the interlocking of these parts. The carrier member is movable vertically a short distance on the spindle 13, the outer end of the bearing 15 having a suitable extension projecting beyond the cover 3, shown as a tubular member 17 having a threaded end by which it is detachably connected to said bearing and a knurled head by means of which it may be rotated. This extension member is normally locked in place by a nut 18 on the upper end of the spindle 13 which may be unscrewed or backed-off on its screw thread, into the position shown in Fig. 3, when the carriage is to be elevated for the purpose of rotating it. If the carriage is to be removed entirely it will be understood that this nut is disconnected from the spindle, but normally it holds the carriage in its lowermost position and when the latter is to be rotated said nut forms a stop for limiting its upward movement. If desired the containers may be made separate and handled singly as shown in Fig. 4, and to insure their being properly centered and guided for vertical movement relatively to the discharge nozzle a suitable guide 13$^a$, similar to the pin 13, is provided which receives the sleeve 15$^a$ attached to and forming a handle on the container. With such an arrangement of parts the cracked ice or other cooling medium may be placed in a receptacle 16$^a$ which is surrounded by other spare containers or butter cylinders forming the charges to be slipped into a container when occasion requires.

In apparatus of this character it is of the utmost importance that the parts while chilled, or maintained in a cold condition, should be kept at a proper relative temperature, and it is necessary that the container and the masses of butter in the several compartments should be kept at a lower temperature than the parts forming the mold, or discharge nozzle. The latter must be maintained in a cooled condition, and must be so disposed in the casing that a varying temperature exists in its different parts in a downward direction from its upper edge 8$^a$ to the point of discharge where the nozzle projects through the bottom 2. This arrangement of the parts is necessary in order to prevent the mass of butter from becoming too soft in the container and in the nozzle, and at the same time permitting it, as the mass moves downwardly, to obtain the desired plasticity to permit it to be ejected from the open mouth of the mold in a smooth condition around its circumference, and at a temperature which renders it capable of being easily spread. It will also be appreciated that these conditions must be maintained in a machine adapted for general use because of the irregularity with which the machine is operated. Frequently several portions of butter will be discharged in rapid succession, or with only short intervals of time elapsing, and again the machine will remain idle for a considerable period of time. In order to meet these conditions I have disposed the upper portion, or cup, of the nozzle partly within the main casing and partly within the recessed portion 6 of the bottom, so that the circulation of a small body of water contained in the bottom of the casing will serve to maintain the desired temperature of these parts, and the tapered neck 7 of the mold contacts with the bottom casting at its threaded edge, but above this point is insulated from the casting and from the influence of water by means of the elastic ring 19, which occupies the position substantially as shown in Figs. 2 and 3, so that the influence of the liquid extends only to a portion of the upper end of the tapered nozzle. The body of water, or other fluid referred to is indicated by 20, and occupies the space beneath the flooring 21, which is so positioned that all of the supply containers, except the one from which the butter is being discharged, rest against it, as shown in Fig. 2.

The butter is discharged by means of an ejector, or plunger, which is carried on the cover 3 of the casing in axial alinement with the discharge mold and one of the operating containers, and comprises a disk 22 carried on the lower end of a piston rod 23. The plunger is preferably of such a diameter as to closely fit the walls of the container, and is provided with a valve member or vent plate, which is so fitted to the plunger that while it is tight as to the passage of butter, it freely allows the passage of air or water in either direction. This construction permits the plunger when inserted in a container to pass into intimate contact with the butter, and also permits the plunger to be easily withdrawn. If upon the insertion of the plunger the air is not completely expelled an air cushion is formed which interferes with the proper discharge of the butter when compressed. Unless means are provided for permitting the entrance of air between the plunger and the mass of butter great difficulty is experienced in withdrawing the plunger. The vent mechanism which I have disclosed as a part of my present invention comprises a plate $23^a$ provided with a plurality of apertures 24, which are offset from similar apertures 25 formed in the plunger itself. This plate is loosely supported upon the headed pins 26, one of which may be made longer than the other, so that when the plunger is elevated the plate will be canted at one side and stripped from the face of the butter. The plunger 22 is also provided with a head portion having an annular rim $22^a$, larger in diameter than the piston rod 23, and overhanging the undercut portion, or neck $22^b$, as best shown in Fig. 13, for the purpose of limiting any attempted upward creeping of the small quantity of salt water expressed from the butter, which works its way onto the top of the plunger, and because of its corrosive action must be kept away from the outer operative parts of the mechanism.

The means employed for operating the ejector preferably comprises a pawl and rack mechanism actuated by the lever 28, pivoted on the cover 3 and oscillating in the plane of the piston rod 23. The latter is provided with the rack bar 29, and the operating lever carries the pawl 30 coöperating therewith, and provided with a plurality of teeth, as shown, which coöperate upon each stroke of the lever, with a corresponding number of teeth on the rack. In this apparatus great strength of parts is required, yet their arrangement necessitates the use of comparatively fine or small rack teeth and in order to prevent fracturing them the pawl is arranged to engage with two or more teeth. The latter are cut into the face of the bar, as shown in Fig. 19, so that the bar at its upper end forms a cam surface $29^a$ along which the rear tooth of the pawl rides for the purpose of holding its forward tooth in the inoperative position until the pawl has been advanced and each of its teeth engages a corresponding tooth on the rack. The teeth on the lower end of the rack are terminated at such a point that the pawl can not engage them until the plunger has been lowered by hand sufficiently to enter the top of a container, thus preventing the latter being damaged should the operator fail to properly center it. A notch $29^b$ is provided at the lower end of the rack bar 29 to receive the locking pawl 34 for the purpose of retaining the plunger in the retracted or inoperative position, a spring 35, acting to normally move the pawl or detent 34 forwardly toward the rack.

Variations in the quantity of butter forced out of the nozzle upon each stroke of the lever may be regulated by fitting to the piston rod 23 racks 29 having teeth of different sizes and for this reason said racks are removably secured in position by suitable fastening devices, such as a screw 31, shown in Fig. 13. All of these racks, however, must have comparatively fine teeth, and because of the force required it is important that the operating pawl be provided with a plurality of teeth in order to prevent either those of the pawl or rack from being broken. The pivot 32 of the pawl 30 is positioned, as shown, below the pivot 33 of the lever 28 and between said pivot 33 and the piston rod 23 so that when the lever is rotated from its uppermost position, as shown in dotted lines in Fig. 2, to the full line position there illustrated, the piston rod 23 and the ejector 22 will be advanced a maximum distance for each intermittent step-by-step forward movement to express a serving of butter from the nozzle 7 and thereafter the movement of the pivot of the pawl will be in a direction away from the piston rod so that the lower tooth of the pawl 30 rocks upon its respective tooth of the rack 29, and permits the rod 23, with the ejector 22 to retrograde under the expansive action of the mass of butter, thus checking the flow of the butter after the desired quantity has been forced out of the mold. Fig. 1 shows that the pivotal connection of the lever 28, comprises two alined pins 33, spaced apart at their inner ends to afford space between them to accommodate the pawl 30, within the lever slot $28^a$, in which the piston rod 23 may be freely moved vertically.

The above described operation of the pawl 30 causes the ejector to be advanced at each stroke of the lever beyond the point at which it is ultimately locked by detent 34. In other words, the ejector is always permitted a slight retrograde movement before it is arrested by the detent 34, so that the butter never presents the appearance of exuding from the nozzle 7 when the machine is idle.

A locking mechanism is provided which prevents the adjustment of the butter holder or carrier, as well as preventing the opening of the cover 3, excepting when the plunger is in retracted position as shown in Fig. 3. This locking means comprises a finger 40 mounted on a transversely extending shaft 41, pivoted on the cover 3, and having a bent or hook-shaped end 42, which is adapted to project over the top of the lock nut 18 on the spindle 13. Also attached to the shaft 41 is an arm 43, which extends forwardly into the path of movement of the piston or plunger 22, and so positioned relatively thereto that when the latter is withdrawn it will engage said arm and cause the finger 40 to be rocked to the position shown in Fig. 3. This movement of the arms 40 and 43 permits the nut 18 to be unscrewed to release the carriage so that the latter may be elevated and adjusted to bring a loaded container into operative position beneath the plunger as shown in Fig. 3. When in this position the carriage will be lowered to seat the bottom of the container on the top of the mold, or nozzle as shown in Fig. 2, and when the parts are in this position the nut 18 will be advanced on its screw thread to again lock the carrier against accidental movement and secure the cover in closed position. In order to facilitate centering the different containers in alinement with the discharge mold 8 and the plunger 22 shallow recesses 44 are provided in the underside of the bottom 14 of the carrier, which coöperate with centering pins 45, shown particularly in Fig. 6.

The butter forced out of the mold or nozzle 7, is severed into patties of equal size by means of a cutting device which is actuated during the last portion of the stroke of the operating lever 28. The butter which is cut off is unsupported, and in order to control the direction of movement of the severed portion a stop is employed which coöperates with the severing device to properly direct the patty onto the underlying butter plate held upon a suitable, adjustable support.

The cutting, or severing mechanism, forming one of the features of my present invention, comprises a crescent shaped arm 46 detachably supported upon the lower end of an oscillatory post 47, which projects beneath the bottom 2 of the casing and is preferably located at the forward side of the discharge nozzle 7. The cutter carrying member, or arm 46 is preferably made detachable so that the cutter, which is liable to be easily broken, may be readily replaced by an unskilled operator. To this end the arm 46 is provided with the hub 48 which latter is perforated with a square hole, through which the squared end of the post 47 projects, the hub 48 being held against the bottom 2 by the swinging bracket 48ª normally in the position shown in full lines in Fig. 9, but arranged to swing laterally as shown by dotted lines in Fig. 9 and in full lines in Fig. 8, thus allowing the arm 46 to be disengaged from the post 47.

The cutting member is preferably made of some substance other than metal, which may be generally described as a non-metallic filament, since a wet string, a silk thread, cat gut, or a thread of pyroxylin compound, prove equally serviceable, and possess the advantage over a wire in that smooth, clean cuts may be made successfully without the butter adhering to the cutting member. There is a serious disadvantage in use of the wire which, because of its limited diameter must contain those properties which give it the requisite tensile strength, which in turn possess a remarkable affinity for the salts and acids in the butter, and consequently contribute to give the wire a remarkably short life. The cutting member, as indicated by 53, is provided at one end with a loop 54, which engages a pin 55 in a recess, or aperture 56, made in the arm 46, near its hub 48, and its opposite end is passed through a notch 57 in the outer end of the carrying arm 46, and thence passes to a securing device 58 on the arm.

Oscillatory movement is imparted to the cutting member preferably by journaling the shaft 47 in the front wall of the casing, and providing its upper end as shown in Fig. 17, with a slot 47ª which receives the key, or angularly shaped end 59 of an oscillatory and longitudinally movable actuating pin 60, which is guided in a bearing 61 secured on the cover 3. The pin 60 lies directly beneath lever 28 and carries a head 62 which is projected into the path of the lever by means of a spring 63. The bearing 61 is provided with a screw thread 64, which parts act as a cam to cause the rotation of said pin 60 the required distance to turn the shaft 47 and arm 46, sufficiently to swing the cutting member 53 across the opening of the discharge nozzle 7 when the lever 28 is fully depressed. As it is preferable to move the cutting member 53 very slowly at the moment of complete severance of the patty, it will be seen that the pitch of the screw thread in bearing 61 is greater at the lower end than at the uper end, which causes the pin 60 to revolve with less speed as it nears the limit of its downward movement, thereby causing the cutting member 53 to finish its forward movement slowly.

Because of the plastic nature of butter it is impracticable to provide a support for the butter as it is severed and the cut considered as a whole, should be accomplished quickly, an action which in itself tends to throw the patty, or severed portion in the direction of the cutting movement of the member 53 just as the latter passes the far side of the discharge mold or nozzle 7. In order to prevent this displacement and to assist in depositing the butter patty, I provide a stop in its path of movement which limits its displacement, but is so shaped that the action of gravitation is not interfered with, but rather, utilized to assist in breaking the lateral displacing movement, and to cause the butter patty to somersault and be deposited bottom side upward on the underlying plate. The form of stop which I employ for accomplishing this purpose comprises a block 70 shown in Figs. 10, 11 and 15, secured to the lower face of the bottom 2 of the casing, in the path of movement of the cutting member 53 at the farther side of the nozzle 7, and having a forwardly projecting lip 71 curved to conform to the circumference of the discharge nozzle, and positioned substantially in alinement with its inner edge and positioned to engage the edge of a patty above its center plane.

Butter has a tendency to accumulate on all of the parts of a machine of this character with which it comes in contact, and unless the stop 70 is kept free and clean the accumulation of butter thereon will prevent the proper discharge of the butter patties, and to obviate this difficulty I have arranged a cleaning member to coöperate with said stop after each cutting operation. The part last referred to is shown in Figs. 10, 11 and 14, as a sliding plate 72 guided on screws 73, and reciprocated by means of an arm 74 also secured to the lower end of the rod 47. Because of the greater distance of movement of the cutting member 53 than that of the cleaning plate 72, provision is made for lost motion between the rod 47 and the arm 74, the parts, however, being arranged so that when the cutting member is in its normal position, shown in Fig. 8, the plate 72 is advanced by a pin 74ª on the hub 48 of the arm 46 acting on the arm 74 so as to cover and wipe off the stop lip 71, and when the cutting member is advanced, as shown in Fig. 9, said plate 72 is retracted by a pin 74ª on an arm 74ᵇ projecting from the cutter arm 46. Upon inspection of Figs. 10 and 11 it will be observed that the end of the mold, or discharge nozzle 7, projects below the bottom of the casing 2 a short distance, while the curved arm 46 is so positioned relatively thereto that the cutting member 53 is held in intimate contact with the rim of the nozzle, the tendency of member 53 being to advance from the positions shown in Figs. 8 and 10 and to be displaced downwardly by and held in tension and engagement with said rim until passing out of contact therewith, as shown in Figs. 9 and 11. Since the tendency of the cutting member 53 as it leaves the rim of the nozzle is to carry a small quantity of butter with it, the lip 71 of the stop is slotted inwardly from each side, as indicated by 71ª, thus forming a passage for the escape of the butter which may be crowded beneath the lip by the cutting member, the excess butter exuding from the slots after successive operations have ensued, being trimmed or cut off by the cleaning plate 72. This plate having a face describing the same arc as the immediate edge of the delivery nozzle is scraped clean on each feeding of the butter, thus carrying any butter adhering to the plate 72 away with the next severed patty.

The plate carrier occupies a position beneath the discharge nozzle 7, as in Fig. 2, but slightly out of alinement therewith in the direction of movement of the cutting member, as indicated in Fig. 8. The support comprises a circular loop 75, preferably made of wire having the parallel ends 76 held in a suitable clip which is vertically and rotatively adjustable on a post 77 depending from the bottom of the casing 2. The clip shown in the present instance comprises an upper nut 78 shown in Figs. 2 and 8 and a lower nut 79 having transverse slots receiving the ends of the arms 76.

In order to facilitate the retracting of the ejector or plunger 22 to withdraw it from the container means are provided whereby it may be moved upwardly by and with the upward movement of the operating lever 28. To this end there is mounted on the piston rod 23 a washer 80 shown detached in Fig. 18 having an aperture 81 therein, which is adapted to receive the end 82 of the operating pawl 30, which is also provided with a projection 83 serving to support the washer and forming a lifter moving it upwardly when the lever 28 is moved from the position shown in dotted lines, Fig. 16, to that shown in full lines. The central perforation 84 of the washer, through which the piston rod 23 passes, is inclined slightly to provide upper and lower biting edges which serve to lock the washer on the piston rod when the washer is tilted by the lever and pawl. During this intermittent lifting of the rod 23 and the ejector 22, by the biting action of the washer 80 upon the rod as the lever 28 is actuated while the pawl is engaged with the washer, an end lug 30ª on the pawl, by acting on a pin 34ª on the detent 34, holds this detent clear of the rack 29, as shown in Fig. 16, to allow intermittent upward movement of the ejector 22. When the piston is fully retracted it is temporarily locked by the detent 34 engaging in the notch 29ᵇ at the lower end of the rack bar as shown in Fig. 3, after the pawl parts 82, 83, have been manually released from the washer 80.

A butter dispensing machine constructed in accordance with my present invention provides means for readily serving a large number of patties of equal sizes at a uniform temperature and of a proper degree to facilitate the spreading of the butter, a fact which in itself has been found lessens the demand for large servings of butter by the patrons of hotels and restaurants. The apparatus possesses a further advantage in that the butter is thoroughly protected while in the machine and is maintained under the most sanitary conditions.

I claim as my invention:

1. In a butter dispenser, the combination with a fixed discharge nozzle, of a carriage comprising a plurality of butter containers adjustable to successively position said containers in alinement with said nozzle, and means for expelling the material from a container through said nozzle.

2. In a butter dispenser, the combination with a discharge nozzle, of a plurality of movable containers adjustable successively into register with said nozzle, and an ejector arranged to coöperate with each container to expel its contents through the nozzle.

3. In a dispensing apparatus, the combination with a fixed nozzle comprising a body portion having an outlet of lesser diameter, of a plurality of containers adjustable into coöperative relationship with said body portion, and means for expelling the contents of a container through said nozzle.

4. In a butter dispensing apparatus, the combination with a discharge nozzle having a body portion open at one end and a nozzle of lesser diameter at the other end, of a rotatable carriage comprising a plurality of containers adjustable successively into register with the body portion of the nozzle and means coöperating successively with said containers to push their contents through said nozzle.

5. In a dispensing apparatus, the combination with a fixed nozzle having a discharge opening and provided with an enlarged inner end, of a revoluble carriage comprising a plurality of containers movable in a plane above said nozzle and adapted to register successively therewith and means for expelling material from a container through the nozzle.

6. In a butter dispensing apparatus, the combination with a casing, a stationary nozzle fitted therein having a restricted discharge orifice, said nozzle and casing being disposed to accommodate a cooling medium surrounding the nozzle, of a plurality of containers adjustable into successive engagement with the nozzle and means for expelling the contents of the containers through the nozzle.

7. In a butter dispensing apparatus, the combination with a casing having an apertured bottom, a nozzle having a discharge aperture fitted therein, said casing being adapted to contain a temperature controlling medium surrounding said nozzle, of a plurality of butter containers adjustable in a plane above said nozzle and adapted to coöperate successively therewith, a carriage supporting said containers and adapted to contain a cooling medium and means for ejecting the contents of said containers and expelling the same through the nozzle.

8. In a butter dispenser, the combination with a casing having top and bottom walls, a nozzle supported on the bottom wall and an ejector mounted on the top wall, of a plurality of containers adjustably mounted within the casing and adapted to coöperate successively with said nozzle and means for operating the ejector.

9. In a butter dispenser, the combination with a casing having bottom and top walls spaced apart, a nozzle mounted in the bottom wall and an ejector supported on the top wall, of a carriage within the casing comprising a plurality of containers adjustable into operative position between said nozzle and ejector and means for moving the ejector downwardly through a container when in operative position relatively to the nozzle.

10. In a butter dispensing apparatus, the combination with a casing comprising top and bottom walls spaced apart, a nozzle supported on the bottom wall and an ejector carried on the top wall, of a plurality of containers mounted upon a pivoted carriage and revoluble in the space between said nozzle and ejector, means for alining the containers successively in register with the nozzle, and means for operating the ejector to expel the contents of a container through the nozzle.

11. In a dispensing apparatus, the combination with a discharge nozzle and an ejector spaced therefrom and in alinement therewith, both comprising an element of an ejecting apparatus, of a plurality of containers connected together and comprising a second element, said elements being disposed for relative adjustment one to the other for the successive ejection of the contents of the containers through said nozzle, means for alining each container with the nozzle, and means for operating the ejector.

12. In a butter dispensing apparatus, the combination with a discharge nozzle and a plurality of connected containers, said containers and nozzle being adapted for relative lateral adjustment into alinement and for relative longitudinal movement into interlocking engagement, of means for expelling the contents of a container through the nozzle.

13. In a butter dispensing apparatus, the combination with a discharge nozzle as one element and a carriage having a plurality of containers and comprising a second element, said nozzle and carriage being mounted for relative adjustment one to the other and relative longitudinal movement into and out of engagement, of means for alining the nozzle and containers successively, and an ejector for expelling the contents of a container through the nozzle.

14. In a butter dispensing apparatus, the combination with a nozzle comprising a body portion having a restricted discharge opening and comprising one element, of a plurality of connected tubular containers constituting a second element, said body portion of the nozzle and one end of each of the container tubes being adapted to fit one within the other, one of said elements being mounted for rotative movement relatively to the other and also adjustable in a direction longitudinally of the container tubes to engage and disengage said elements, and means for ejecting the contents of a container through the nozzle.

15. In a butter dispensing apparatus, the combination with a discharge nozzle having a body portion, of a carriage comprising a plurality of tubular containers each having an end adapted to fit within the body of the nozzle, said carriage being adjustable, first, in a direction to disconnect a container from the nozzle, second, to position another container in alinement therewith, and third, to insert the end of the last mentioned container into the body of the nozzle, and means for ejecting the contents of a container through the nozzle.

16. In a butter dispensing apparatus, the combination with a vertically disposed fixed nozzle, of a carriage comprising a plurality of tubular containers adjustable in a horizontal position to aline said containers successively with said nozzle and also adjustable vertically to move the containers into and out of engagement with said nozzle, and means for ejecting the contents of a container through the nozzle.

17. In a butter dispensing apparatus, the combination with a vertical nozzle having a body portion, of a vertically adjustable and revoluble carriage comprising a plurality of tubular containers disposed in a plane above the nozzle, the upper edge of the body of the nozzle and the adjacent ends of the container tubes being arranged to fit one within the other.

18. In a butter dispensing apparatus, the combination with a casing having a bottom provided with a recess, of a nozzle having a discharge opening leading through the bottom of the casing and comprising a body portion projecting above said recess, a platform surrounding the body of the nozzle and spaced from the bottom of the casing, a rotatable carriage having a plurality of tubular containers adjustable to position one of their number into engagement with the body of the nozzle, and an ejector for expelling the contents of such container through said nozzle.

19. In a dispensing apparatus, the combination with a casing comprising a bottom having an aperture, of a discharge nozzle fitted into the latter and projecting above said bottom, a carriage comprising a plurality of connected containers resting on said platform and adapted to contain a cooling medium, said carriage being revoluble to successively position each container in alinement with said nozzle, and an ejector for expelling the contents of a container through the nozzle.

20. In a butter dispensing apparatus, the combination with a casing comprising a bottom and side walls, an inner platform arranged in spaced relation to the bottom and side walls, and a discharge nozzle having an upper end located above the platform and a lower discharge end extending through said bottom, of a carriage revolubly supported within the casing comprising a plurality of tubular containers resting upon the platform and movable into successive engagement with the body of the nozzle, said carriage being adapted to contain a cooling medium, and means for expelling the contents of a container through the nozzle.

21. In a butter dispensing apparatus, the combination with a fixed discharge nozzle having an upper open end and a revoluble drum comprising a bottom and side walls and having therein a plurality of tubular containers having also open ends adapted to fit within the upper end of the nozzle, a bearing member on which the drum is longitudinally movable, and centering pins coöperating with the bottom of the drum to support it in elevated position excepting when one or another of said containers is alined with the nozzle.

22. In a butter dispensing apparatus, the combination with a casing comprising an apertured bottom, a nozzle fitted therein having an open inner end, and a bearing located at one side of the nozzle, of a carriage journaled on the bearing and also movable axially thereof comprising a bottom having recesses, and a plurality of tubular containers supported thereon, and having their lower ends arranged to fit within the nozzle, and a member adapted to hold the carriage in elevated position arranged to coöperate with the recesses in the carriage bottom to center the respective containers relatively to the nozzle and allow the carriage to be adjusted to position a container in operative engagement with the nozzle.

23. In a dispensing apparatus, the combination with a container having a discharge opening and a plunger therein having a rod provided with rack teeth cut beneath the face of the rod, of an operating lever and a pawl thereon having a plurality of teeth one of which engages the face of the rod when the latter is at the limit of its movement in one direction and serves to prevent the engagement of the pawl with single teeth on the rack.

24. The combination with a casing adapted to contain a cooling medium and also to hold a plurality of containers in spaced relationship, of a discharge nozzle having a body portion fixed in the bottom of said casing, means for alining successive containers with said discharge nozzle, and means for forcing the contents of said containers through said discharge nozzle.

25. The combination with a casing having an aperture, a discharge nozzle positioned in said aperture and extending therethrough, of a removable tubular container with means for positioning said container in operative connection with said discharge nozzle, said casing being adapted to contain a cooling medium surrounding said container and a portion of said nozzle, and means for forcing the contents of said container through said discharge nozzle.

26. In a dispensing apparatus, the combination with a casing and a discharge nozzle fixed therein, of a container coöperating with the nozzle and removably supported within the casing and means for expelling the contents of the container through the nozzle.

27. In a dispensing apparatus, the combination with a casing and a discharge nozzle fixed therein, of a guide in the casing extending parallel with the axis of the nozzle, a container supported on the guide and removably coöperating with the nozzle and means for expelling the contents of the container.

28. In a dispensing apparatus, the combination with a casing having a container with a discharge opening at its lower end, of a platform located above the bottom of the casing to provide a space for fluid surrounding the discharge end of the container and means for expelling the contents of the container.

29. The combination with a casing having an aperture, a delivery nozzle having a discharge opening located in the aperture and provided with a larger body portion located within said casing, a member supported within said casing carrying a plurality of containers, means for locking said member with one or another of the containers in alinement with said delivery nozzle, means for expressing the contents of the containers, and means operable from the exterior of the casing for moving the member to position said containers in alinement with said nozzle.

30. In a dispensing apparatus, the combination with a casing having an apertured bottom wall, a discharge nozzle located in the aperture in the bottom wall and a bearing located at one side of the nozzle, of a carriage journaled on the bearing and comprising a plurality of containers, means operable from the exterior of the casing for revolving the casing to position the containers in alinement with the nozzle and means for ejecting the contents of the containers through the nozzle.

31. In a dispensing apparatus, the combination with a casing having top and bottom walls spaced apart, a discharge nozzle in the bottom wall, and a carriage journaled on an axis located at one side of the nozzle and comprising a plurality of containers adapted to coöperate with said nozzle, of a member for revolving the carriage projecting through said top wall and means for expressing the contents of the containers through the nozzle.

32. In a dispensing apparatus, the combination with a casing having a bottom wall and a removable top wall spaced therefrom, a discharge nozzle in the bottom wall and a bearing member extending upwardly from the latter through the top, of a carriage journaled on the bearing member having an operating sleeve by which it may be rotated also projecting through the top, a locking device on the projecting portion of the bearing member coöperating with said sleeve and a plurality of containers on the carriage adapted to coöperate successively with the nozzle.

33. In a dispensing apparatus, the combination with a container, an ejector therein having a piston rod, operating devices for moving said ejector downwardly and means for disconnecting said operating devices, of a lever and connective members between said lever and ejector to move the latter upwardly by the lever when said operating devices are disconnected.

34. In a dispensing apparatus, the combination with a container and an ejector therein having a piston rod provided with rack teeth, of a pivoted lever carrying a pawl coöperating with the rack to move the ejector in one direction and having a tail piece and a member coöperating with the latter and said rod and serving to hold the pawl in inoperative position and to be moved thereby to adjust the ejector in the other direction.

35. In a dispensing apparatus, the combination with a container and an ejector therein having a piston rod, of an oscillating operating member, mechanism actuated by the movement of the member in one direction to advance the ejector in the container and means adapted to be set to render said mechanism inoperative and when so set serving to retract the ejector upon movement of the member in the other direction.

36. In a dispensing apparatus, the combination with a container and an ejector therein having a piston rod provided with rack teeth, of a pivoted lever carrying a pawl coöperating with the rack to move the ejector in one direction and a locking member on the piston rod arranged to engage the pawl to hold it in an inoperative position and adapted to engage the rod to move said ejector in the other direction.

37. In a dispensing apparatus, the combination with a casing having side walls, a bottom and a movable cover, a container in the casing having a discharge end extending through the bottom and an ejector in the container, of a cutting device movably supported on the bottom of the casing, ejector actuating means mounted on said cover and operating members for the cutting device disposed in a side wall of the casing and arranged to be operated by the ejector actuating means.

38. In a dispensing apparatus, the combination with a casing having side walls, a bottom and a movable cover, a container in the casing having a discharge end extending through the bottom and an ejector in the container, of a cutting device movably supported on the bottom of the casing, a vertically reciprocating lever pivoted on the cover for operating the ejector, means for actuating the cutting member supported on the casing, and a device on the cover adapted to be depressed by said lever and arranged to impart the movement of the lever to said cutter actuating means.

39. In a dispensing apparatus, the combination with a casing having side walls, a bottom and a movable cover, a container in the casing having a discharge end extending through the bottom, and an ejector in the container, of a cutting device movably supported on the bottom of the casing, a lever pivoted on the cover for operating the ejector, means for actuating the cutting member having an exposed end at the top of the casing, and a plunger on the cover beneath the lever arranged to engage said end to impart movement to the cutter actuating means.

40. In a dispensing apparatus, the combination with a casing having side walls, a bottom and a movable cover, a container therein having an end discharging through the bottom, and an ejector in the container having a piston rod, of a lever pivoted on the cover in rear of the rod and coöperating therewith and arranged with its free end projecting beyond the edge of the casing, a cuttter movably supported on the bottom of the casing and means for actuating it located in the path of the free end of the lever and comprising separable parts, one portion being mounted on the side wall of the casing and the other being mounted on the cover, a rod journaled on the side wall of the casing and connected with the cutter, a plunger on the cover located in the path of the lever and coöperating cam members on the plunger and cover for imparting oscillating movement to said plunger.

41. In a butter dispensing apparatus, the combination with a container, having a discharge opening, and means for expelling its contents, of a cutting member traversing said opening and devices for actuating said cutting member at a given speed across the major portion of the opening and with decreasing speed during the remainder of its travel.

42. In a dispensing apparatus, the combination with a casing having side walls, a bottom and a movable cover, a container therein having an end discharging through the bottom, an ejector in the container having a piston rod, and a lever pivoted on the cover and coöperating with the piston rod, of a cutter journaled on the bottom of the casing, an oscillating shaft imparting movement thereto, an oscillating and longitudinally movable plunger arranged to be actuated by the lever, said plunger and shaft having detachable interlocking portions arranged to permit the opening and closing of the cover and to cause the actuating of the shaft upon movement of the plunger.

43. In a butter dispensing machine, the combination with a container having a discharge opening, and means for expelling the contents of the container, of a stop located at one side of the discharge opening, a cutter movable across said opening in a direction toward the stop, and means for operating the cutter.

44. In a butter dispensing machine, the combination with a container having a discharge opening and means for expelling the contents of the container, a cutter traversing said opening and means for operating it, of a stop disposed to limit the lateral movement of the patty when severed by the cutter.

45. In a butter dispensing machine, the combination with a container having a discharge opening and means for expelling the contents of the container, of a stop located in alinement with one side of the opening and spaced therefrom, a cutter traversing the opening and entering the space between it and the stop and means for operating the cutter.

46. In a butter dispensing apparatus, the combination with a container having a discharge opening and means for expelling its contents, of a cutter, means for moving it across the opening and a stop located in the path of the cutter and disposed to engage the edge of the severed patty at a point in proximity to its upper surface.

47. In a butter dispensing apparatus, the combination with a container having a discharge opening and means for expelling its contents, of a cutter, means for moving it across the opening and a stepped stop at one side of the opening disposed to co-operate with the cutter and to first engage the edge of the severed patty near its upper surface and during its fall to subsequently engage said edge near its lower surface.

48. In a butter dispensing apparatus, the combination with a container having a discharge opening and means for expelling its contents, of a cutter, means for moving it across the opening and a stop arranged at one side of the opening having a shoulder in proximity thereto disposed to engage the edge of a severed patty near its upper surface and having a second shoulder located beneath and in rear of the first mentioned shoulder.

49. In a butter dispensing apparatus, the combination with a container having a discharge opening and means for expelling its contents, of a cutter, means for moving it across the opening, a stop arranged at one side of the opening, a cleaning member movable upon the stop, and means for operating said member.

50. In a butter dispensing apparatus, the combination with a container having a discharge opening and means for expelling its contents, of a cutter, means for moving it across the opening, a guide located with its end forming a stop at one side of the opening, a cleaning member supported on the guide, and means for reciprocating said member.

51. In a dispensing apparatus, the combination with a container having a discharge nozzle and a cutter movable thereacross, of a stop at one side of the nozzle in the path of the cutter, a cleaning-off member co-operating with the stop and means for operating the cutter and actuating said member in timed relation thereto.

52. In a dispensing apparatus, the combination with a container having a discharge nozzle and a cutter movable thereacross, of a stop at one side of the nozzle, a cleaning-off member normlly occupying a position in alinement with the face of the stop, means for operating the cutter and operating connections between said means and member for retracting the latter during the completion of the movement of the cutter.

53. In a dispensing apparatus, the combination with a container having a discharge nozzle and a cutter movable thereacross, of a guide extending laterally below the nozzle and disposed with its forward end forming a stop, a cleaning member mounted on the guide and normally occupying a position in alinement with the forward end of the stop, an actuator for the cutter and an operating connection between the cutter and cleaning member serving to reciprocate the latter at the extremes of movement of the cutter.

54. An ejector for butter containers comprising a piston head composed of plates movable relatively to each other arranged to provide a vent for the escape of air when the piston is moved in one direction and permit the entrance of air when moved in the opposite direction.

55. An ejector for butter containers comprising an apertured piston head and an apertured plate movable axially toward and from the face of the head, and arranged with its apertures out of registering communication with those of the head.

56. In a butter dispensing apparatus, the combination with a container having a discharge nozzle, at its lower end, means for expelling the butter therefrom and a cutter for severing the expelled portion of the butter, of a stop located at one side of the nozzle and adapted to limit the lateral movement of the severed patty and a plate holder adjustably supported relatively to said nozzle and stop.

57. In a butter dispensing apparatus, the combination with a support, a container mounted thereon having a discharge opening and means for expelling the butter therefrom, a cutter traversing said opening and a stop carried on the support at one side of the opening, of a post projecting downwardly from the support and a plate holder on the post adjustable both horizontally and vertically relatively to the discharge opening.

58. In a butter dispensing apparatus, the combination with a support, a butter container mounted thereon having a discharge opening at its lower end, means for expelling the butter therefrom, and a cutter for severing the expelled portion, of a post depending from the support and a plate holder adjustable on the post.

59. In a butter dispensing apparatus, the combination with a support, a butter container mounted thereon having a discharge opening at its lower end, means for expelling the butter therefrom and a cutter for severing the expelled portion, of a post depending from the support, and a plate holder adjustable horizontally and vertically on the post comprising a loop portion having parallel arms and a clip on the post embracing said arms.

60. In a butter dispensing apparatus, the combination with a casing, a discharge nozzle fixed therein and a carrier comprising a plurality of containers adjustable vertically and movable laterally into successive engagement with said nozzle, of an ejector movable longitudinally of the container, and means for locking the carriage to prevent its movement adapted to coöperate with and be released by said ejector when the latter is withdrawn from the container.

61. In a butter dispensing apparatus, the combination with a casing, a nozzle fitted therein, and an ejector supported on the casing and movable toward and from said nozzle, of a carrier embodying a plurality of containers adjustable successively into alinement with said nozzle and movable vertically into and out of engagement therewith and devices on the casing for locking the carriage against vertical movement arranged to coöperate with and be released by the ejector when the latter is moved into a predetermined position.

62. In a butter dispensing apparatus, the combination with a support, a nozzle secured to a lower portion of the support and an ejector member movable toward and from the nozzle and carried upon an upper portion of the support, of a carrier comprising a plurality of butter containers movable in the space between the nozzle and ejector to successively aline said containers with the nozzle and also adjustable vertically to move said containers into and out of engagement with said nozzle, and a locking device on the frame normally engaging a portion of the carriage having a release member coöperating with the ejector when in retracted position.

63. In a butter dispensing apparatus, the combination with a casing comprising top and bottom walls, a nozzle secured in the bottom wall, and an ejector movable toward and from the nozzle and carried on the top wall, of a rotatable carriage positioned between said walls and supported for vertical movement and comprising a plurality of butter containers adapted to coöperate with said nozzle, a locking device comprising a latch member normally engaging the carriage to restrain its vertical movement, and having a trip member projecting over the ejector in position to be engaged thereby when said ejector is retracted into its inoperative position, and means for restraining the rotative movement of the carriage when at its lowermost position.

64. In a butter dispensing apparatus, the combination with a casing comprising top and bottom walls, a bearing supported upon the latter and a carriage rotatable thereon and guided for vertical movement, of a nozzle supported on the bottom wall beneath the carriage and adapted to coöperate with the containers on the carriage and to prevent the rotation of the latter when in its lowermost position, an ejector supported above the carriage in alinement with the nozzle and adjustable through the coöperating container, and a locking device on the top wall coöperating with the carriage to prevent its vertical movement and adapted to be released upon the retracting of the ejector from the container.

65. In a butter dispensing apparatus, the combination with a support, a movable container, an ejector for expressing its contents and mechanism for actuating the ejector which is rendered operative upon adjustment of the ejector into a predetermined position, of means for locking the container controlled by the ejector and adjusted into locked position when the ejector is in a position to be engaged by its actuating mechanism.

66. In a butter dispensing apparatus, a container, means for expressing portions of the contents thereof, a frame carrying a cutting member, means for operating it to sever said expressed portions from the remainder and a displaceable support for the frame serving to allow the removal and replacement of said frame.

67. In a dispensing apparatus, the combination with a container having a discharge opening and an ejector therein having a rod provided with rack teeth, of an operating lever and a pawl thereon coöperating with the rack, said rack being in an inoperative position when the ejector is retracted from the container, and means for supporting the plunger in its retracted position.

68. In a butter dispenser, the combination with a butter container and an ejector therein, of a lever moving in the plane of the ejector and means for moving said ejector in either direction by and with the movement of said lever.

69. In a dispensing apparatus, the combination with a casing having an aperture, and adapted to support a plurality of containers, a delivery nozzle located in the aperture and provided with a larger body portion located within the casing, means for locking successive containers in alinement with said delivery nozzle, and means for expressing the contents of the containers, said containers being adapted to be moved into and out of alinement with said delivery nozzle from the exterior of the casing.

70. In a dispensing apparatus, the combination with a casing, a container having a discharge opening, an ejector having a piston rod and an operating lever coöperating with the latter, of a cutter pivoted in a position to traverse the discharge opening, and an oscillating and longitudinally movable plunger having operating connections with the cutter and arranged to be depressed by the movement of the lever.

71. An ejector for butter containers comprising a piston and a face plate normally separated therefrom and movable into engagement therewith when moved into contact with a mass of butter and separating therefrom to admit the entrance of air when the piston is retracted.

72. An ejector for butter containers comprising a piston composed of plates substantially coextensive in area coöperating upon the downward actuation of the piston rod to prevent the passage of butter to the rear side of the piston when said piston is in contact with the butter.

73. In a butter dispensing apparatus the combination with a support, a discharge nozzle therein and a plurality of connected butter containers movable vertically into and out of engagement with the nozzle and adjustable successively into alinement therewith, of an ejector in alinement with the nozzle and prevented from downward movement relatively thereto by the containers when the latter are displaced relatively to the nozzle and means for forcing the ejector through a container arranged to be rendered operative when the ejector is located in a predetermined position of adjustment.

74. In a butter dispensing apparatus the combination with a support, a container thereon having a discharge opening and an ejector for expressing the contents of the container, of means for actuating the ejector arranged to be rendered operative only upon adjustment of the ejector into a predetermined position axially of the container.

75. In a butter dispensing apparatus, the combination with a casing comprising a bottom, side walls and a movable cover, a discharge nozzle in the bottom, a carriage comprising a plurality of containers adjustable into engagement with the nozzle, an ejector for expelling the contents of the containers through the nozzle and means for operating the ejector, of a member extending through the cover and engaging the carriage and serving to secure both the cover and carriage against movement.

76. An ejector for butter containers comprising a piston having a rod and an annular drip shoulder surrounding the lower end of the rod.

77. An ejector for butter containers comprising a piston having a neck upon its rear side, a drip shoulder overhanging the neck and a rod extending upwardly from the latter.

78. In a butter dispensing apparatus, the combination with a support, a butter container thereon and a movable part on the support above the container adapted to be tilted into an inoperative position, of an ejector coöperating with the container comprising a piston rod and carried on said movable part and means for preventing water accumulated on the ejector and lower end of the rod from passing along the latter when said parts are in an inclined position.

BENNETT D. STRAIGHT.

Witnesses:
G. WILLARD RICH.
JOHN S. BRONK.